United States Patent
Ngo et al.

(10) Patent No.: US 10,447,685 B2
(45) Date of Patent: *Oct. 15, 2019

(54) SYSTEMS, METHODS AND COMPUTER-READABLE STORAGE MEDIA FACILITATING MOBILE DEVICE GUEST NETWORK ACCESS

(71) Applicant: NETWORK PERFORMANCE RESEARCH GROUP LLC, Campbell, CA (US)

(72) Inventors: Terry F K Ngo, Bellevue, WA (US); Seung Baek Yi, Norwich, VT (US); Erick Kurniawan, San Francisco, CA (US); Kun Ting Tsai, Fremont, CA (US)

(73) Assignee: NETWORK PERFORMANCE RESEARCH GROUP LLC, Campbell, CA (US)

( * ) Notice: Subject to any disclaimer, the term of this patent is extended or adjusted under 35 U.S.C. 154(b) by 369 days.

This patent is subject to a terminal disclaimer.

(21) Appl. No.: 15/493,890

(22) Filed: Apr. 21, 2017

(65) Prior Publication Data
US 2018/0091494 A1    Mar. 29, 2018

Related U.S. Application Data

(63) Continuation of application No. 15/278,098, filed on Sep. 28, 2016, now Pat. No. 9,674,187.

(51) Int. Cl.
| | | |
|---|---|---|
| *H04L 29/06* | (2006.01) | |
| *H04W 12/00* | (2009.01) | |
| *H04W 76/10* | (2018.01) | |
| *H04W 12/08* | (2009.01) | |

(Continued)

(52) U.S. Cl.
CPC ........ *H04L 63/083* (2013.01); *H04L 63/0853* (2013.01); *H04L 63/0876* (2013.01);
(Continued)

(58) Field of Classification Search
CPC . H04L 63/083; H04L 63/107; H04L 63/0853; H04L 63/0876; H04L 63/102;
(Continued)

(56) References Cited

U.S. PATENT DOCUMENTS

| | | |
|---|---|---|
| 9,497,078 B1 | 11/2016 | Cha et al. |
| 2001/0036184 A1* | 11/2001 | Kinoshita ......... H04L 29/12367 370/389 |

(Continued)

OTHER PUBLICATIONS

Notice of Allowance for U.S. Appl. No. 15/278,098 dated Mar. 8, 2017, 30 pages.

*Primary Examiner* — Darren B Schwartz
(74) *Attorney, Agent, or Firm* — Amin, Turocy & Watson, LLP (57) ABSTRACT

Mobile device access to a guest network is facilitated. A method comprises: detecting a home network having an associated access point based on the device being within a first defined proximity of the associated access point; and transmitting information indicative of a request to establish a guest network via the associated access point of the home network and providing authentication information for an entity associated with the device. The method also comprises establishing the guest network according to one or more assigned resources based on receipt of an acknowledgement message received from a cloud device, wherein receipt of the acknowledgment message from the cloud device is based on cloud device determination that the entity associated with the device is authenticated and based on receipt of an authorization by an entity associated with the home network.

19 Claims, 6 Drawing Sheets

(51) Int. Cl.
- *H04W 12/06* (2009.01)
- *H04W 4/021* (2018.01)
- *H04W 48/04* (2009.01)
- *H04W 88/08* (2009.01)
- *H04W 84/18* (2009.01)
- *H04W 84/12* (2009.01)

(52) U.S. Cl.
CPC .......... *H04L 63/102* (2013.01); *H04L 63/107* (2013.01); *H04W 4/021* (2013.01); *H04W 12/0027* (2019.01); *H04W 12/06* (2013.01); *H04W 12/08* (2013.01); *H04W 48/04* (2013.01); *H04W 76/10* (2018.02); *H04W 84/12* (2013.01); *H04W 84/18* (2013.01); *H04W 88/08* (2013.01)

(58) Field of Classification Search
CPC . H04W 12/0027; H04W 76/10; H04W 12/08; H04W 12/06; H04W 4/021; H04W 48/04; H04W 88/08; H04W 84/18; H04W 84/12
See application file for complete search history.

(56) References Cited

U.S. PATENT DOCUMENTS

| | | | |
|---|---|---|---|
| 2003/0145334 A1* | 7/2003 | Motoe | H04N 7/163 725/123 |
| 2005/0086346 A1 | 4/2005 | Meyer | |
| 2005/0208926 A1* | 9/2005 | Hamada | H04W 12/08 455/410 |
| 2006/0190991 A1 | 8/2006 | Iyer | |
| 2007/0149172 A1 | 6/2007 | Dickinson | |
| 2007/0189321 A1 | 8/2007 | Lee et al. | |
| 2007/0220154 A1* | 9/2007 | El Husseini | H04L 63/0281 709/227 |
| 2007/0255837 A1 | 11/2007 | Hassan et al. | |
| 2010/0146599 A1 | 6/2010 | Padmanabha et al. | |
| 2011/0235549 A1 | 9/2011 | Ahlers et al. | |
| 2011/0298596 A1 | 12/2011 | Warrick | |
| 2012/0309409 A1 | 12/2012 | Grosman et al. | |
| 2013/0055363 A1 | 2/2013 | Dattagupta et al. | |
| 2013/0143499 A1 | 6/2013 | Ando et al. | |
| 2013/0152168 A1 | 6/2013 | Nasir et al. | |
| 2013/0227291 A1* | 8/2013 | Ahmed | H04L 63/0281 713/171 |
| 2013/0309971 A1 | 11/2013 | Kiukkonen et al. | |
| 2014/0022920 A1 | 1/2014 | Dua et al. | |
| 2014/0127994 A1 | 5/2014 | Nightingale et al. | |
| 2014/0162600 A1 | 6/2014 | Chang et al. | |
| 2014/0192737 A1 | 7/2014 | Belghoul et al. | |
| 2014/0280938 A1 | 9/2014 | Kadaba et al. | |
| 2014/0282914 A1 | 9/2014 | Holmelin et al. | |
| 2015/0223053 A1 | 8/2015 | Gillin, IV | |
| 2016/0226842 A1 | 8/2016 | Mower | |
| 2016/0330626 A1 | 11/2016 | Barillaud et al. | |

* cited by examiner

SYSTEMS, METHODS AND COMPUTER-READABLE STORAGE MEDIA FACILITATING MOBILE DEVICE GUEST NETWORK ACCESS

CROSS-REFERENCE TO RELATED APPLICATION

This application is a continuation of, and claims priority to, U.S. patent application Ser. No. 15/278,098, filed on Sep. 28, 2016, entitled "SYSTEMS, METHODS AND COMPUTER-READABLE STORAGE MEDIA FACILITATING MOBILE DEVICE GUEST NETWORK ACCESS." The entirety of the above noted application is incorporated herein by reference.

BACKGROUND

When a user is confronted with a guest that would like guest access to the user home network, the user must typically provide his/her user home network password or provide a guest password for access. However, providing the password for the user home network poses a major security risk; further, the user typically must manually remove the guest from the home network upon the guest ending the guest access and this can be cumbersome and time-consuming. As such, systems, methods and computer-readable storage media that facilitate mobile device guest network access are desired.

SUMMARY

One or more embodiments described herein relate to network access and more specifically to systems, methods and computer-readable storage medium that facilitate guest device guest network access.

In an embodiment, a computer-readable storage medium is provided. The computer-readable storage medium can store computer-executable instructions that, in response to being executed by a processor of a device, causes the device to perform operations. The operations can comprise: detecting a home network having an associated access point based on the device being within a first defined proximity of the associated access point; and transmitting information indicative of a request to establish a guest network via the associated access point of the home network and providing authentication information for an entity associated with the device. The operations can also comprise: establishing the guest network according to one or more assigned resources based on receipt of an acknowledgement message received from a cloud device, wherein receipt of the acknowledgment message from the cloud device is based on cloud device determination that the entity associated with the device is authenticated and based on receipt of an authorization by an entity associated with the home network.

In another embodiment, a method is provided. The method can comprise: receiving, by a device comprising a processor, an authorization message from a second device associated with an entity having a home network accessible via an access point, wherein the authorization message comprises information authorizing establishment of a guest network for a third device via the access point, wherein the home network comprises a personal area network; and transmitting, by the device, to the third device, access information to obtain access by the third device to the guest network via the access point according to one or more assigned resources for the guest network.

In another embodiment, a computer-readable storage medium is provided. The computer-readable storage medium comprises computer-executable instructions that, in response to being executed by a processor of a device, causes the device to perform operations. The operations can comprise: detecting a home network having an associated access point based on the device being within a first defined proximity of the associated access point and based on the device and the associated access point having a subscription to a defined service, wherein the home network comprises a personal area network; and transmitting information indicative of a request to establish a guest network via the associated access point of the home network. The operations can also comprise establishing the guest network according to one or more assigned resources based on receipt of an acknowledgement message, wherein receipt of the acknowledgment message is based on a determination that an entity associated with the device is authenticated and based on receipt of an authorization from an entity associated with the home network.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. As used herein, the terms "server" and "cloud device" are interchangeable.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity," "user," "user device" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

Figure 1:
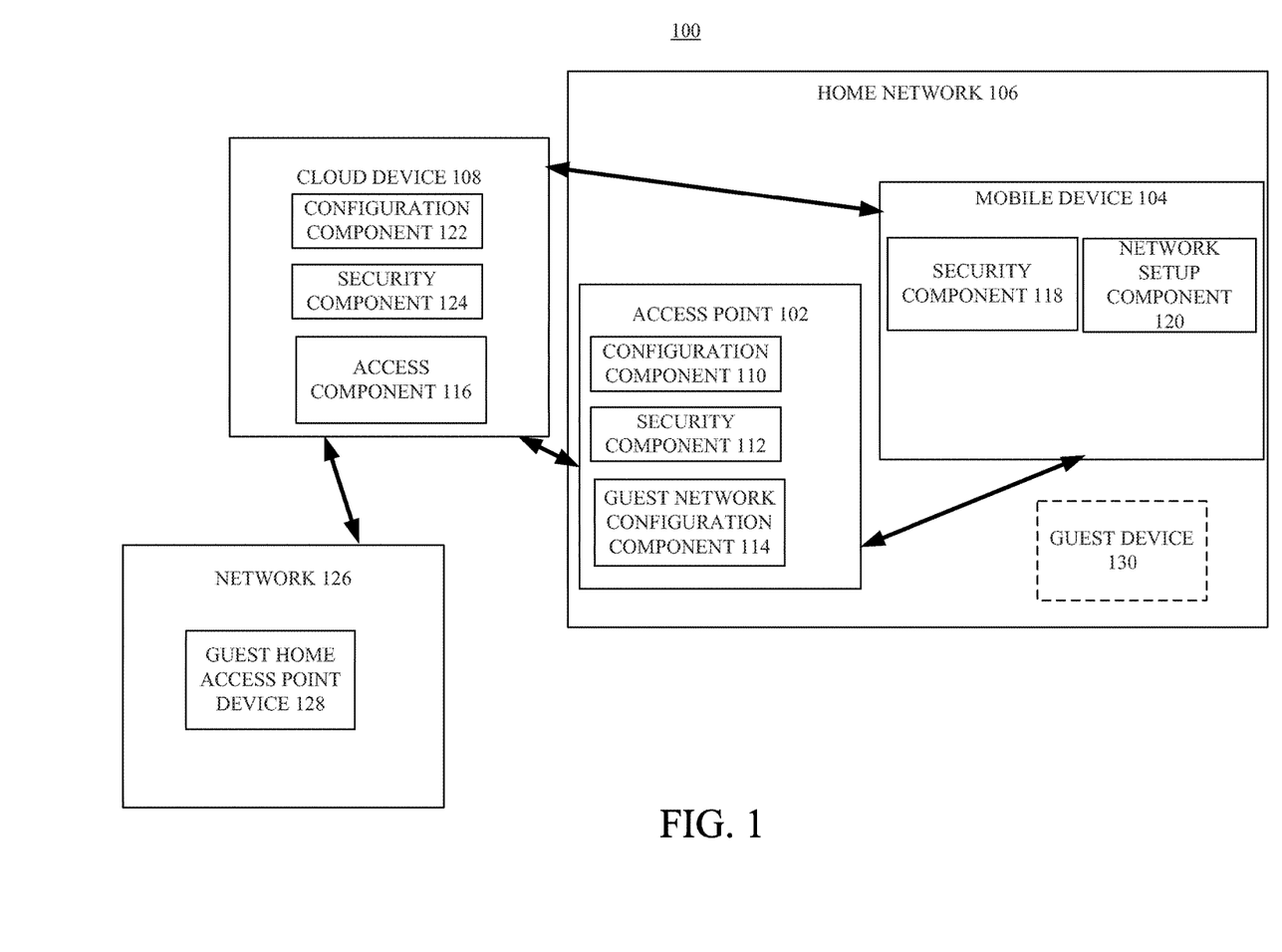
FIG. 1 illustrates an example block diagram of a system that facilitates mobile device guest network access in accordance with one or more embodiments described herein.

FIG. 1 illustrates an example block diagram of a system that facilitates mobile device guest network access in accordance with one or more embodiments described herein. The system 100 can include a cloud device 108, an access point (AP) 102 and/or a mobile device 104, one or more of which can be electrically and/or communicatively coupled to one another. In some embodiments, the system 100 can also include a guest device 130 that can access the home network 106 of the mobile device 104 in accordance with some embodiments described herein. As used herein, guest device 130 access of a home network 106 of the mobile device 104 can be referred to as "guest device guest network access" and/or "mobile device guest network access." The home network of the guest device 130 is the network 126, which includes an associated guest home access point device 128 with associated configuration preferences of the guest device 130 while the AP 102 typically provides for the preferred configuration of the mobile device 104.

As shown, the mobile device 104 can include a security component 118 and/or a network setup component 120. The AP 102 can include a configuration component 110, security component 112 and/or a guest network configuration component 114. The cloud device 108 can include a configuration component 122, a security component 124 and/or an access component 116. In some embodiments, the network 126 can be distinct from the home network 106 and can include a guest home AP device 128.

The home network 106 can provide a communication network for mobile device 104. This communication network can be accessed by guest device 130 to provide the above-referenced "guest access" or "guest network access" in embodiments based on authentication of the guest device 130 and approval of access by the mobile device 104.

In various embodiments, the communication network can be or include any number of different personal area networks (PANs) including, but not limited to, Wi-Fi, Bluetooth or other PAN technology. In some embodiments, Bluetooth Low Energy (BTLE) protocol can be employed to facilitate communications between the AP 102 and the mobile device 104. In other embodiments, any number of different types of wireless technology that provide a personal area network can be employed.

In the embodiment shown, system 100 can facilitate the guest device 130 securely accessing the home network 106 without need for the guest device 130 to learn or use the login and password of the mobile device 104 and/or without need to have a user associated with the home network 106 manually setup and take down a configuration allowing the guest device 130 to access the home network 106.

In various embodiments, the guest device 130 can be a mobile device such as a smart phone, tablet, smart watch or any number of other mobile devices that can communicate over a PAN. In the embodiment shown, when the guest device 130 is within a defined proximity of AP 102, guest device 130 can detect home network 106 based on one or more signals emitted by AP 102. For example, in some embodiments, guest device 130 can have defined software that allows guest device 130 to determine whether a network is within detection range and that provides a particular type of network to which guest device 130 and/or mobile device 104 have a subscription.

Based on or after the detection of the home network 106, the guest device 130 can transmit to the cloud device 108 information indicative of a request to establish a guest network via the AP 102 of the home network 106. In some embodiments, the information transmitted by the guest device 130 with the request can include, but is not limited to, authentication information. The authentication information can be authentication information associated with the mobile device 104. The authentication information associated with the mobile device 104 need not be the login and password for the mobile device 104; rather, in some embodiments, the authentication information can be information established and/or approved by the mobile device 104 and/or information that allows access to the AP 102, which is the AP for the mobile device 104. In some embodiments, the authentication information can be information provided via or based on the subscription held by the user associated with the guest device 130.

The security component 124 of the cloud device 108 can receive the authentication information and determine whether the authentication indicates that access to the home network 106 should be permitted. If access is determined to be permitted, the cloud device 108 can determine the configuration for the guest network to provide to the guest device 130. In some embodiments, the cloud device 108 can determine the configuration based on configuration information stored at and/or accessible by the configuration component 122 of the cloud device 108. Access can be granted based on the access component 116 transmitting a message to the guest device 130 that includes information for logging into an online service providing access to the AP 102. For example, an online service could provide an authentication service while not having a website login. In some embodiments, the transmitted message can be a message containing credentials to access the home network 106 provided by AP 102. In some embodiments, after connecting to the home network 106, the guest device 130 can be directed to a web access point (e.g., in a business situation) requesting the user of the guest device 130 to accept terms and conditions of using the home network 106.

In some embodiments, the guest device 130 can establish a guest network on the home network 106. The established guest network can have one or more resources assigned to the guest network from the cloud device 108 and/or based on defined information that can be previously-determined by the owner of the mobile device 104 (which can be the owner of the home network 106). As such, different resources can be allocated for different guest networks from the same AP 102. Some guest devices may obtain one set of resources while other guest devices may obtain another set of resources.

In some embodiments, the resources can be identified in an acknowledgement message received from the cloud device 108, wherein receipt of the acknowledgment message from the cloud device 108 is based on cloud device determination that the user associated with the guest device 130 is authenticated. The resources can include network resources in some embodiments. The resource in some embodiments can be a guest network that is allocated, secured with random credentials and provided to the guest device 130. Generally, only one network would be provided, however, in some embodiments, one or more resources (e.g., networks) can be offered to the guest device 130. In various embodiments, policies can be adhered to in the resource allocation. The policies can include but are not limited to shared printers, shared file folders (e.g., network storage) or shared media playback devices (e.g., audio and video bridges). In some embodiments, information detailing the particular resources can be stored in and/or accessible by the cloud device 108.

The primary authentication method can be to receive the credentials once mobile device 104 authorizes receipt of such credentials. Further authorization or access could be directed to a web access point on the network as described herein with reference to FIG. 1.

In other embodiments, the authentication information can be at least one of information for logging into a defined website (e.g., a website that allows access of the AP 102) or information for logging into a business entity network (e.g., in cases in which the home network 106 is a business entity network). Thus, the home network 106 can be a residential network or a business network (e.g., associated with a corporation, etc.).

In some embodiments, prior to sending the acknowledgment message to the guest device 130, the mobile device 104 can also be contacted by the cloud device 108 to determine whether the mobile device 104 grants access to the guest device 130. For example, the security component 118 can receive information sent from the guest device 130 and/or cloud device 108 detailing authentication information of the guest device 130 and can process the information to determine if access will be granted.

In various embodiments, the mobile device 104 need not be within the home network 106 to receive access requests and provide a grant of access to the guest device 130. For example, in some embodiments, the mobile device 104 may not be near the home network 106 yet can authorize access by the guest device 130 remotely via a wide area network (WAN) communicatively coupled to the cloud device 108.

In some embodiments, the network setup component 120 of the mobile device 104 can send an acknowledgement message authorizing the cloud device 108 to grant access to the guest network 130. In some embodiments, the acknowledgement message authorizing the cloud device 108 to grant access to the guest network 130 can be sent from any device associated with the owner of the AP 102. Thus, while a mobile device 104 is shown, in some embodiments, the notification to the user associated with the AP 102 can be received on a work computer (not shown) of the user/owner of the mobile device 104, the mobile device 104, a smart watch (not shown) of the user or any other device for the user.

In some embodiments, the acknowledgement message from the cloud device can comprise a code configured to allow the guest device 130 to access the home network 106 (which is the guest network for the guest device 130). The code can specify or define one or more resources that the guest device 130 can access of the home network 106. For example, the resources can include, but are not limited to, an amount of time or bandwidth for use of the home network, days and/or times of use, priority of data used by the guest device 130, the Quality of Service of the data used by the guest device 130, whether the guest device 130 can re-join the home network 106 after being on the home network and then leaving the home network 106 (for example, a guest network can be established such that a guest device 130 is allowed to leave the network and the guest network will be re-established upon the guest device 130 coming back into proximity of the home network 106) or the like. While the term "code" is used herein, in various embodiments, the acknowledgement message from the cloud device 108 need not be limited to transmitting a code. In various embodiments, the acknowledgement message generally can transmit any type of information that represents one or more credentials to access the network. In various implementations, in lieu of a code, the information transmitted can be or include the network name and password rather than a code per se. In some implementations, the information transmitted can be or include one or more human readable credentials.

The resources can be allocated by the configuration component 110 of the AP 102 based on the code in some embodiments. Accordingly, one code can facilitate access by a guest device 130 to a first set of resources of the home network 106 while a second code can facilitate access by a guest device 130 to a second set of resources of the home network 106. Additionally, the AP 102 can receive the code and determine whether it is suitable for allowing access to the AP 102 by processing with the security component 112.

In some embodiments, the request from the guest device 130 can be a request to establish access to the home network 106 for the guest device 130 as a masquerade network having a defined configuration. The guest network configuration component 114 of the AP 102 can provide for a masquerade network in some embodiments. For example, the masquerade network can be a network via the home network 106 but that has the preferences of the guest device 130 home network (e.g., the network 126) even though the guest device 130 is not accessing the guest home AP device 128. As described herein, network 126 is the home network of the guest device 130.

This configuration from the network 126 of the guest device 130 can be the configuration and display/layout of the network to which the guest device 130 is accustomed and therefore convenient for the guest device 130 to use notwithstanding the guest device 130 is actually accessing the home network 106 and not the network 126. The configuration of the network 126 and/or guest home AP device 128 can be stored in the cloud device 108 and the cloud device 108 can facilitate such configuration based on the receipt of the request from the guest device 130 for a masquerade network. The cloud device 108 can send a special code causing the configuration preferences of the guest device 130 home network (e.g., network 126) to be viewable from the guest device 130.

In some embodiments, the network for the guest device 130 can be further established according to a defined geofence around the AP 102 and wherein the home network 106 (which is the guest network for the guest device 130) can be provided for access to the AP 102 by the mobile device 104 via the one or more assigned resources based on a determination (e.g., by the AP 102 and/or by the cloud device 108) that the mobile device 104 is within a second defined proximity of the defined geofence, and wherein access to the home network (which is the guest network for the guest device 130) is closed based on a determination that the mobile device 104 fails to be within the second defined proximity of the defined geofence.

In some embodiments, the home network 106 (which is the guest network for the guest device 130) is further established according to a defined geofence around the associated AP and wherein the home network (guest network for the guest device 130) is provided for access by the mobile device 104 via the one or more assigned resources based on a determination that the mobile device 104 is within a second defined proximity of the defined geofence and a defined time period associated with the one or more assigned resources has not elapsed, and wherein access to the home network (guest network for the guest device 130) is closed based on a determination that the mobile device 104 fails to be within the second defined proximity of the defined geofence or based on a determination that the defined time period associated with the one or more assigned resources has elapsed.

In some embodiments, after the guest device 130 sends the request for access to the AP 102, an authorization message can be received from a device (e.g., cloud device 108 and/or mobile device 104 associated with the AP 102). The authorization message can comprise information authorizing establishment of a guest network for one or more devices (which can be the guest device 130 or another guest device (not shown)). In some embodiments, the other guest device can transmit a request to obtain access by the other guest device to the home network 106 (which is a guest network to the other guest device) via the AP 102 according to one or more assigned resources for the network. Thus, more than one guest device can request access to the home network 106 at any particular time and these time periods during which access is requested can be overlapping or non-overlapping in various different embodiments.

In some embodiments, an inquiry message requesting permission to establish the guest network for the other guest device can be transmitted, wherein the transmitting is performed in response to a determination that the entity associated with the other guest device is authenticated. In some embodiments, the authorization message is received in response to the transmitting the inquiry message and wherein the authorization message comprises information indicative of one or more defined conditions for the home network 106 (which is the guest network for the other guest device).

In various embodiments, the one or more defined conditions can comprise one or more defined conditions related to a time period during which access to the home network 106 is granted, a geofence associated with the AP 102 specifying the area within which the access to the home network 106 is granted to the guest device 130 (in the event the guest device 130 would like to leave the immediate detectable proximity of the AP 102, the access can still be granted upon return to the detectable proximity if all guest device 130 movement was confined to the geofence, for example) or a quality of service provided via the home network 106.

In some embodiments, the quality of service is specified via a policy associated with differing levels of service for different entities requesting the home network (which is the guest network for the guest device or the other guest device). Thus, the different levels of Quality of Service can be predefined based on any number of factors including, but not limited, the identity of the user of the guest device 130, the category of user of the guest device 130 (e.g., relative versus neighbor), the type of access requested and/or the purpose of the access (e.g., casual internet surfing versus work-related matters), data overages, security access violation (e.g., if there were repeated attempts to try to access a resource over and over), access to prohibited web sites and the like. In some embodiments, the mobile device 104 can be connected to and using the home network 106 concurrent with guest access by the guest device 130. In that embodiment, a Quality of Service policy can indicate the mobile device 104 to always have preferred or superior levels of Quality of Service relative to the levels of Quality of Service of the guest device 130.

In the various embodiments described herein, the home network that is the guest network for one or more guest devices can be automatically closed by the cloud device 108 and/or the mobile device 104 based on determination of one or more defined conditions for the home network. The condition can include, but are not limited to, the guest device 130 allotted access time having elapsed, the guest device 130 being outside of a defined geofence for the home network 106, usage by the guest device 130 of all allocated data, violation of any security access feature or violation by use of prohibited websites, etc.

While memory and/or processors are not expressly shown in FIG. 1, in some embodiments, one or more of cloud device 108, mobile device 104, AP 102 and/or guest home AP device 128 can include a memory and/or processor. Each memory can store one or more computer-readable storage media that can include computer executable instructions to perform one or more functions described herein. One or more of the memory can include one or more processors that can execute the one or more computer-executable instructions.

Figure 2:
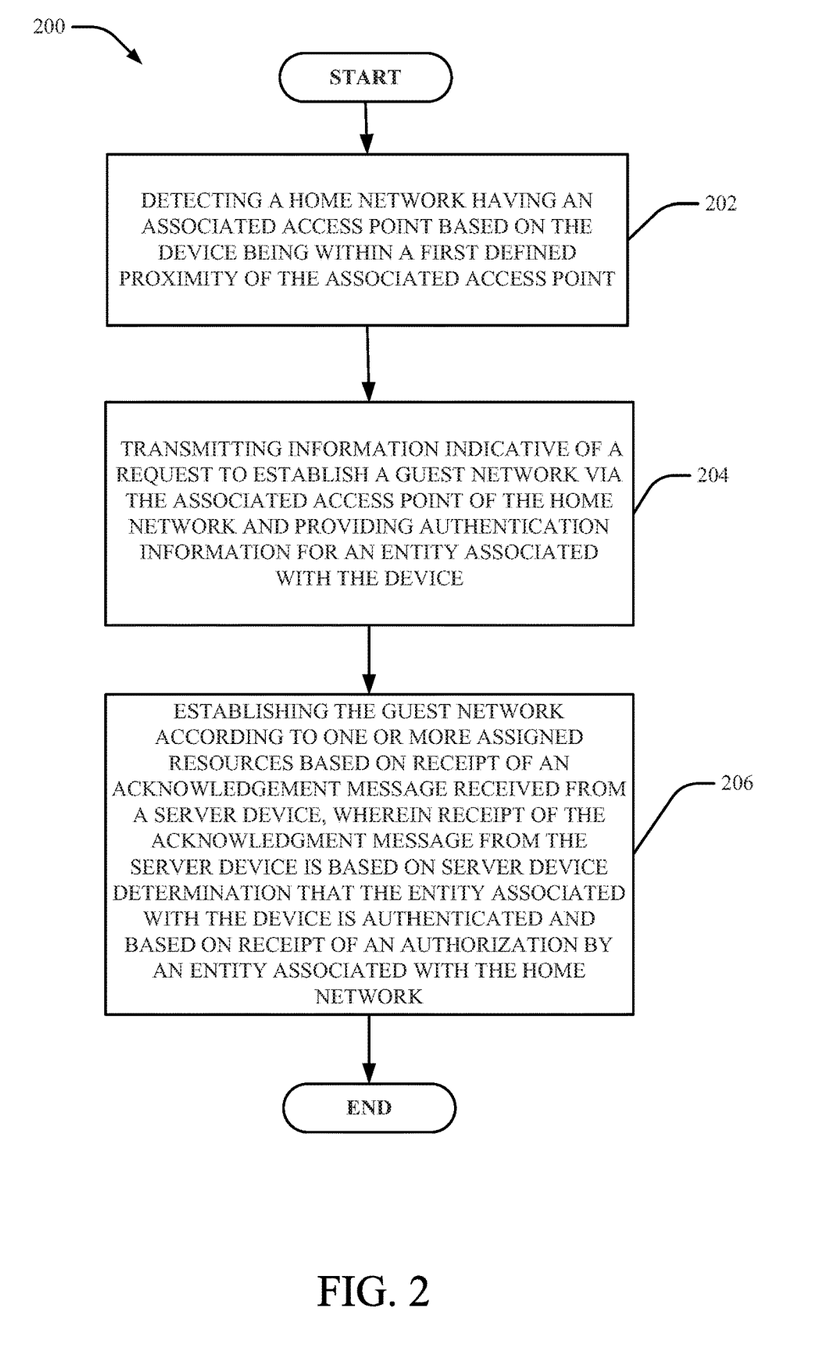
FIGS. 2, 3, 4 and 5 illustrate example flowcharts of methods that facilitate mobile device guest network access in accordance with one or more embodiments described herein.

FIGS. 2, 3, 4 and 5 illustrate example flowcharts of methods that facilitate mobile device guest network access in accordance with one or more embodiments described herein. Turning first to FIG. 2, at 202, method 200 can comprise detecting a home network having an associated access point based on the device being within a first defined proximity of the associated access point. In some embodiments, the detecting is performed via a BLUETOOTH communication protocol.

At 204, method 200 can comprise transmitting information indicative of a request to establish a guest network via the associated access point of the home network and providing authentication information for an entity associated with the device. In some embodiments, the authentication information can be at least one of information for logging into a defined website or information for logging into a business entity network. In some embodiments, the request further comprises a request to establish the guest network as a masquerade network having a defined configuration and wherein the device has a second home network having the defined configuration. In some embodiments, the device and the access point have respective subscriptions for a system with which the home network is associated.

At 206, method 200 can comprise establishing the guest network according to one or more assigned resources based on receipt of an acknowledgement message received from a cloud device, wherein receipt of the acknowledgment message from the cloud device is based on cloud device determination that the entity associated with the device is authenticated and based on receipt of an authorization by an entity associated with the home network. In some embodiments, the acknowledgement message comprises a code configured to allow access to the guest network by the device according to the one or more assigned resources. In some embodiments, the one or more assigned resources comprises a defined time period during which the guest network is accessible by the device. In some embodiments, the one or more assigned resources comprises a quality of service assigned to the guest network.

In some embodiments, the acknowledgement message further comprises information indicative of the one or more assigned resources authorized by the entity associated with the home network.

In some embodiments, the guest network is further established according to a defined geofence around the associated access point and wherein the guest network is provided for access by the device via the one or more assigned resources based on a determination that the device is within a second defined proximity of the defined geofence, and wherein access to the guest network is closed based on a determination that the device fails to be within the second defined proximity of the defined geofence.

In some embodiments, the guest network is further established according to a defined geofence around the associated access point and wherein the guest network is provided for access by the device via the one or more assigned resources based on a determination that the device is within a second defined proximity of the defined geofence and a defined time period associated with the one or more assigned resources has not elapsed, and wherein access to the guest network is closed based on a determination that the device fails to be within the second defined proximity of the defined geofence or based on a determination that the defined time period associated with the one or more assigned resources has elapsed.

Figure 3:
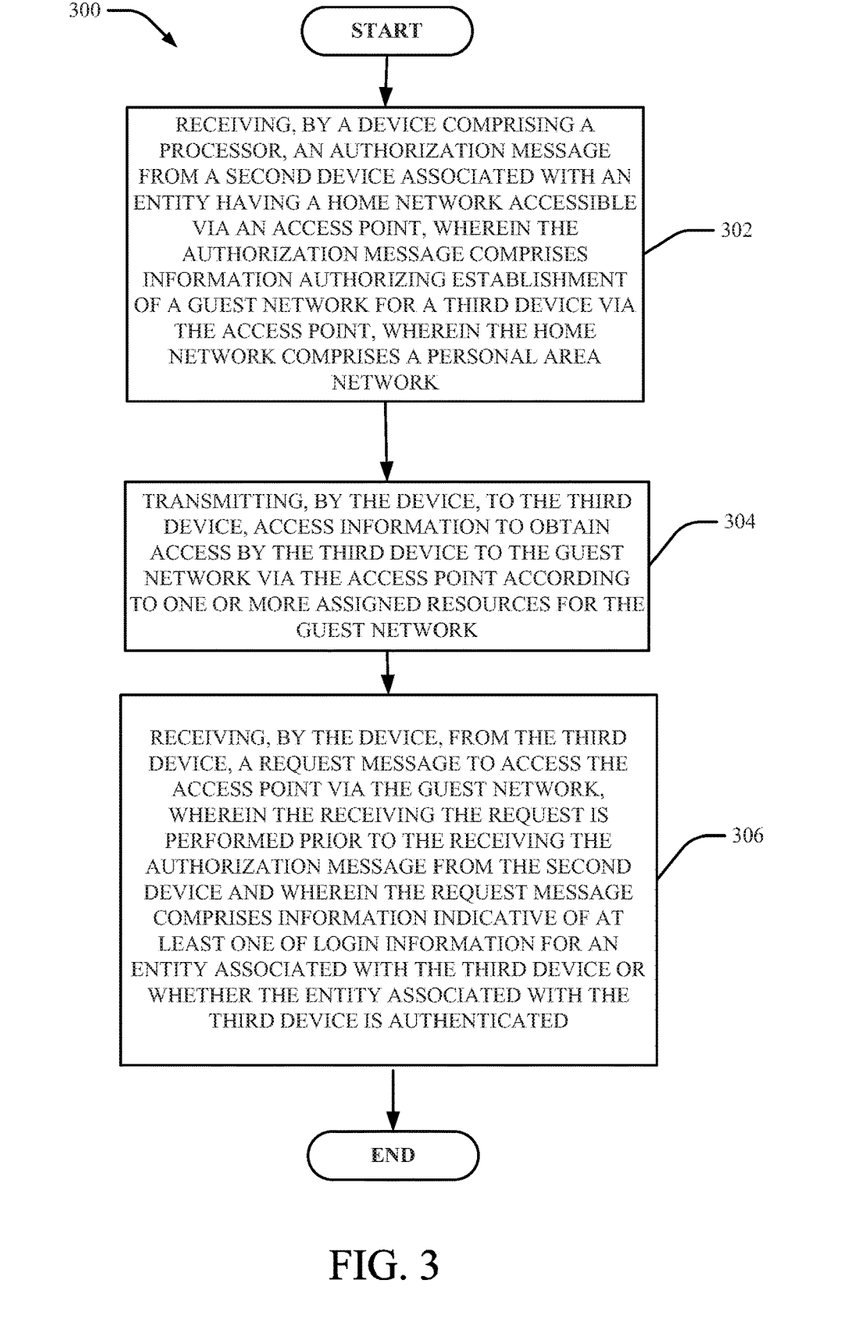

Turning now to FIG. 3, at 302, method 300 can comprise receiving, by a device comprising a processor, an authorization message from a second device associated with an entity having a home network accessible via an access point, wherein the authorization message comprises information authorizing establishment of a guest network for a third device via the access point, wherein the home network comprises a personal area network. In some embodiments, the second device can act as a delegate to the first device to allow guest access. The delegate role of the second device can be established a priori through another process via the cloud device 108. At 304, method 300 can comprise transmitting, by the device, to the third device, access information to obtain access by the third device to the guest network via the access point according to one or more assigned resources for the guest network.

At 306, method 300 can comprise receiving, by the device, from the third device, a request message to access the access point via the guest network, wherein the receiving the request is performed prior to the receiving the authorization message from the second device and wherein the request message comprises information indicative of at least one of login information for an entity associated with the third device or whether the entity associated with the third device is authenticated.

Figure 4:
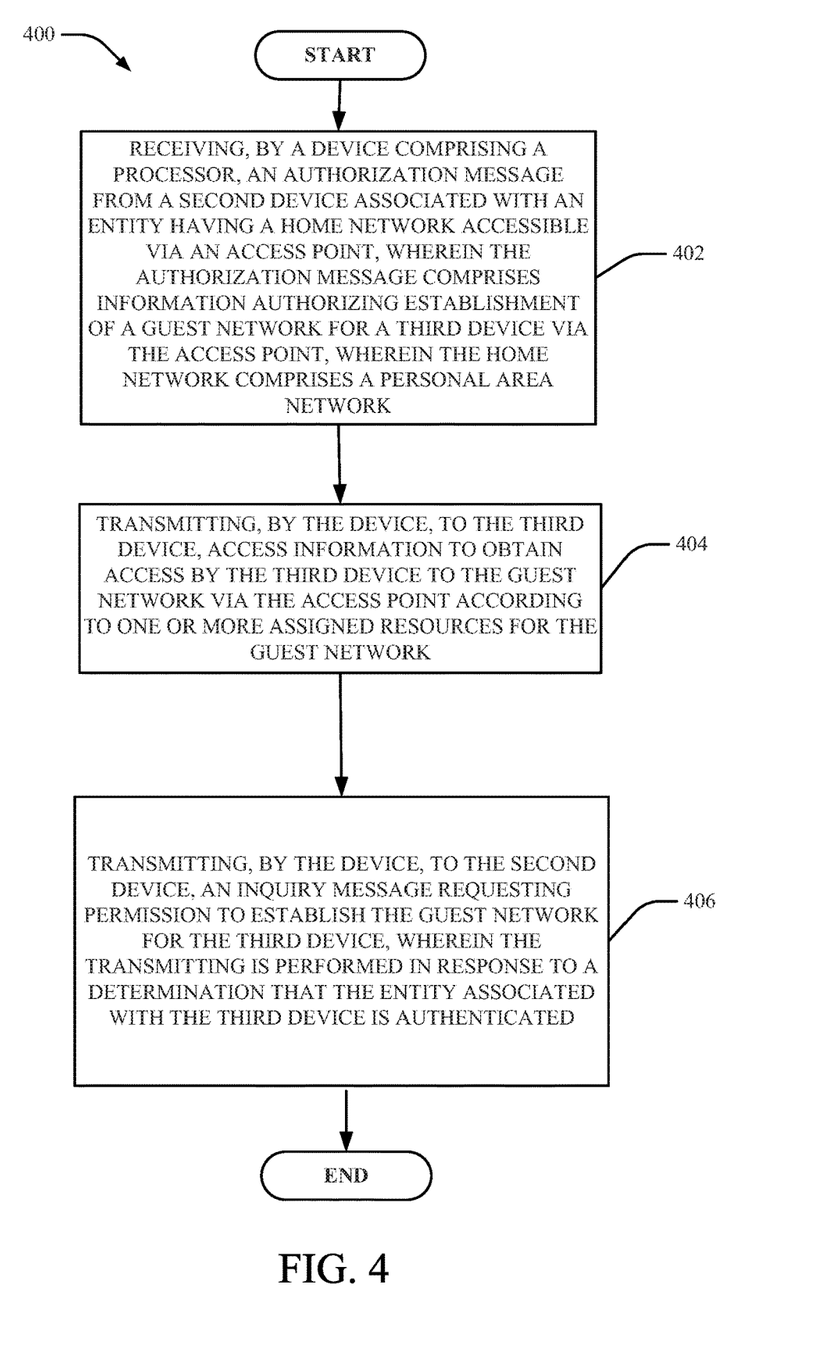

Turning now to FIG. 4, steps 302 and 304 of method 300 can be performed in method 400. At 402, method 400 can comprise transmitting, by the device, to the second device, an inquiry message requesting permission to establish the guest network for the third device, wherein the transmitting is performed in response to a determination that the entity associated with the third device is authenticated.

In some embodiments, the receiving the authorization message is in response to the transmitting the inquiry message and wherein the authorization message comprises information indicative of one or more defined conditions for the guest network. In some embodiments, one or more defined conditions comprises one or more defined conditions related to a time period during which access to the guest network is granted, a geofence associated with the access point the area within which the access to the guest network is granted or a quality of service provided via the guest network.

In some embodiments, the quality of service is specified via a policy associated with differing levels of service for different entities requesting the guest network. In some embodiments, the guest network is automatically closed by the device based on determination of one or more defined conditions for the guest network.

Figure 5:
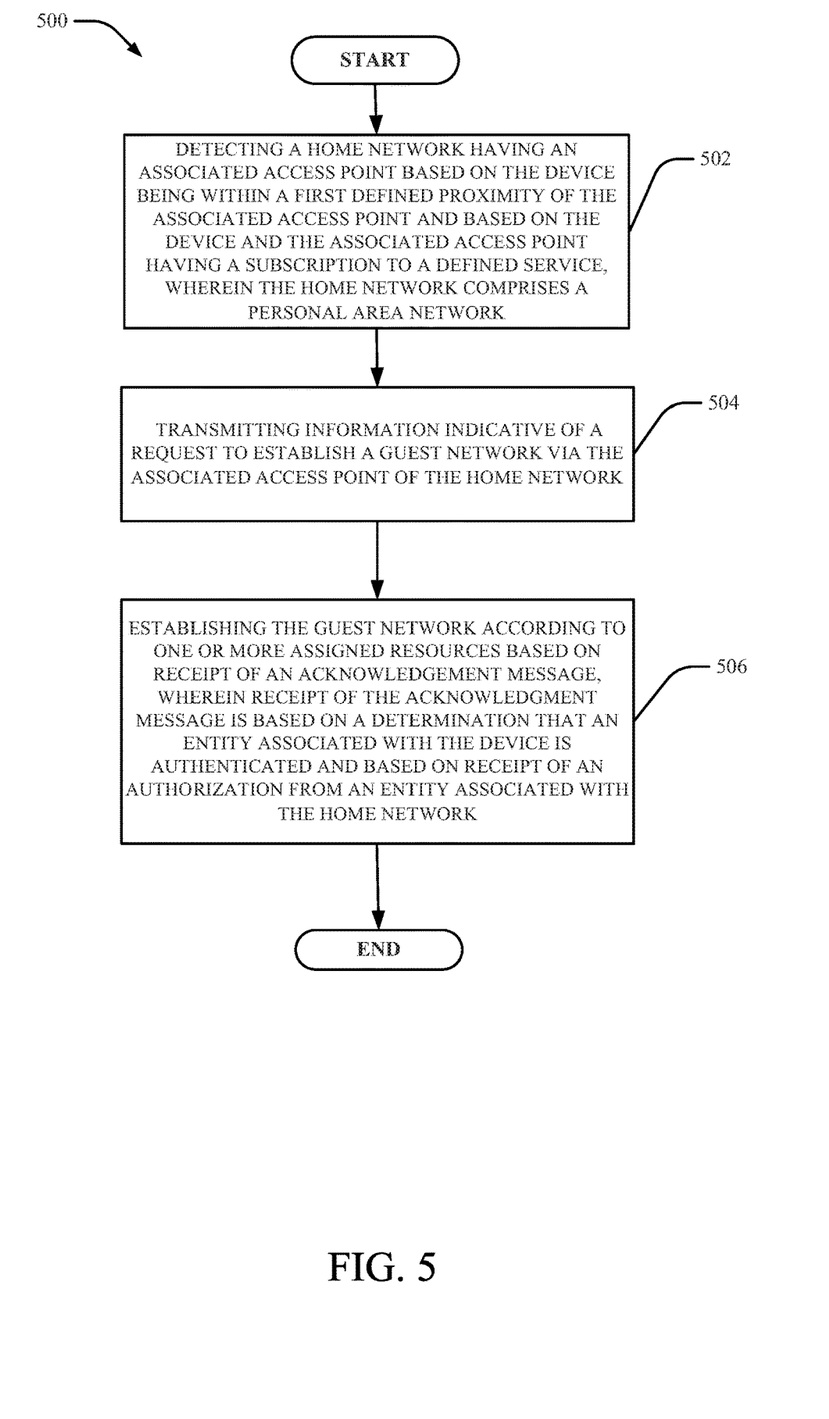

Turning now to FIG. 5, at 502, method 500 can comprise detecting a home network having an associated access point based on the device being within a first defined proximity of the associated access point and based on the device and the associated access point having a subscription to a defined service, wherein the home network comprises a personal area network. At 504, method 500 can comprise transmitting information indicative of a request to establish a guest network via the associated access point of the home network. At 506, method 500 can comprise establishing the guest network according to one or more assigned resources based on receipt of an acknowledgement message, wherein receipt of the acknowledgment message is based on a determination that an entity associated with the device is authenticated and based on receipt of an authorization from an entity associated with the home network. In some embodiments, the acknowledgement message comprises a code configured to allow access to the home network via the device according to the one or more assigned resources.

Figure 6:
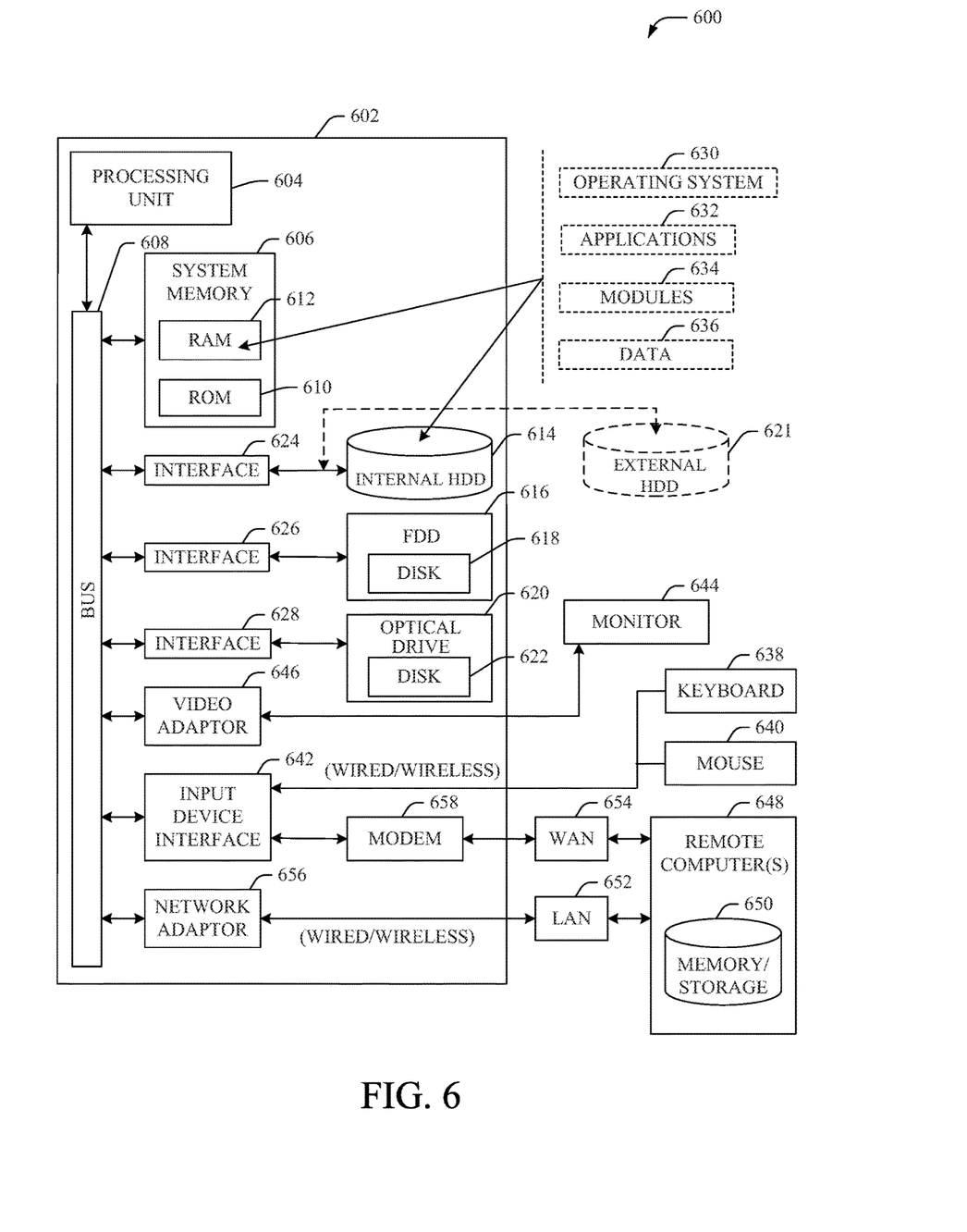
FIG. 6 illustrates a block diagram of a computer operable to facilitate mobile device guest network access in accordance with one or more embodiments described herein.

FIG. 6 illustrates a block diagram of a computer operable to facilitate mobile device guest network access in accordance with one or more embodiments described herein. Repetitive description of like elements employed in other embodiments described herein is omitted for sake of brevity. In some embodiments, the computer, or a component of the computer, can be or be comprised within any number of components described herein comprising, but not limited to, access point 102, mobile device 104, cloud device 108 and/or guest home AP device 128 (or a component of access point 102, mobile device 104, cloud device 108 and/or guest home AP device 128).

In order to provide additional text for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EE-PROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment 600 for implementing various embodiments of the embodiments described herein comprises a computer 602, the computer 602 comprising a processing unit 604, a system memory 606 and a system bus 608. The system bus 608 couples system components comprising, but not limited to, the system memory 606 to the processing unit 604. The processing unit 604 can be any of various commercially available processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 610 (e.g., EIDE, SATA), which internal hard disk drive 614 can also be configured for external use in a suitable chassis (not shown), a magnetic floppy disk drive 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface, respectively. The interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 602, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A communication device can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 652 through a wired and/or wireless communication network interface or adapter 656. The adapter 656 can facilitate wired or wireless communication to the LAN 652, which can also comprise a wireless AP disposed thereon for communicating with the wireless adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments can employ various AI-based schemes for carrying out various embodiments thereof. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis to prognose or infer an action that a communication device desires to be automatically performed. A support vector machine (SVM) is an example of a classifier that can be employed. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A non-transitory computer-readable storage medium storing computer-executable instructions that, in response to being executed by a processor of a device, causes the device to perform operations, wherein the operations comprise:
　　detecting a home network having an associated access point based on the device being within a first defined proximity of the associated access point;
　　transmitting information indicative of a request to establish a guest network via the associated access point of the home network and providing authentication information for an entity associated with the device; and
　　establishing the guest network according to one or more assigned resources based on receipt of an acknowledgement message received from a cloud device, wherein receipt of the acknowledgment message from the cloud device is based on cloud device determination that the entity associated with the device is authenticated and based on receipt of an authorization by an entity associated with the home network, wherein the request further comprises a request to establish the guest network as a masquerade network having a defined configuration, wherein the device has a second home network having the defined configuration, and wherein the defined configuration was previously established on the second home network.

2. The computer-readable storage medium of claim 1, wherein the acknowledgement message comprises a code configured to allow access to the guest network by the device according to the one or more assigned resources.

3. The computer-readable storage medium of claim 2, wherein the acknowledgement message further comprises information indicative of the one or more assigned resources authorized by the entity associated with the home network.

4. The computer-readable storage medium of claim 1, wherein the one or more assigned resources comprises a defined time period during which the guest network is accessible by the device.

5. The computer-readable storage medium of claim 1, wherein the one or more assigned resources comprises a quality of service assigned to the guest network.

6. The computer-readable storage medium of claim 1, wherein the authentication information can be at least one of information for logging into a defined website or information for logging into a business entity network.

7. The computer-readable storage medium of claim 1, wherein the device and the access point have respective subscriptions for a system with which the home network is associated.

8. The computer-readable storage medium of claim 1, wherein the guest network is further established according to a defined geofence around the associated access point and wherein the guest network is provided for access by the device via the one or more assigned resources based on a determination that the device is within a second defined proximity of the defined geofence, and wherein access to the guest network is closed based on a determination that the device fails to be within the second defined proximity of the defined geofence.

9. The computer-readable storage medium of claim 1, wherein the guest network is further established according to a defined geofence around the associated access point and wherein the guest network is provided for access by the device via the one or more assigned resources based on a determination that the device is within a second defined proximity of the defined geofence and a defined time period associated with the one or more assigned resources has not elapsed, and wherein access to the guest network is closed based on a determination that the device fails to be within the second defined proximity of the defined geofence or based on a determination that the defined time period associated with the one or more assigned resources has elapsed.

10. The computer-readable storage medium of claim 1, wherein the detecting is performed via a personal area network communication protocol.

11. The computer-readable storage medium of claim 1, wherein the acknowledgement message comprises a code configured to allow access to the home network via the device according to the one or more assigned resources.

12. A method, comprising:

receiving, by a device comprising a processor, an authorization message from a second device associated with an entity having a home network accessible via an access point, wherein the authorization message comprises information authorizing establishment of a guest network for a third device via the access point, wherein the home network comprises a personal area network;

transmitting, by the device, to the third device, access information to obtain access by the third device to the guest network via the access point according to one or more assigned resources for the guest network; and receiving, by the device, from the third device, a request message to access the access point via the guest network, wherein the request further comprises a request to establish the guest network as a masquerade network having a defined configuration, wherein the device has a second home network having the defined configuration, and wherein the defined configuration was previously established on the second home network.

13. The method of claim 12, wherein the receiving the request message is performed prior to the receiving the authorization message from the second device and wherein the request message comprises information indicative of at least one of login information for an entity associated with the third device or whether the entity associated with the third device is authenticated.

14. The method of claim 13, wherein the guest network is automatically closed by the device based on determination of one or more defined conditions for the guest network.

15. The method of claim 12, further comprising:

transmitting, by the device, to the second device, an inquiry message requesting permission to establish the guest network for the third device, wherein the transmitting is performed in response to a determination that the entity associated with the third device is authenticated.

16. The method of claim 15, wherein the receiving of the authorization message is in response to the transmitting the inquiry message and wherein the authorization message comprises information indicative of one or more defined conditions for the guest network.

17. The method of claim 16, wherein the one or more defined conditions comprises one or more defined conditions related to a time period during which access to the guest network is granted, a geofence associated with the access point the area within which the access to the guest network is granted or a quality of service provided via the guest network.

18. The method of claim 17, wherein the quality of service is specified via a policy associated with differing levels of service for different entities requesting the guest network.

19. A non-transitory computer-readable storage medium storing computer-executable instructions that, in response to being executed by a processor of a device, causes the device to perform operations, detecting a home network having an associated access point based on the device being within a first defined proximity of the associated access point and based on the device and the associated access point having a subscription to a defined service, wherein the home network comprises a personal area network;

transmitting information indicative of a request to establish a guest network via the associated access point of the home network; and establishing the guest network according to one or more assigned resources based on receipt of an acknowledgement message, wherein receipt of the acknowledgment message is based on a determination that an entity associated with the device is authenticated and based on receipt of an authorization from an entity associated with the home network, wherein the request further comprises a request to establish the guest network as a masquerade network having a defined configuration, wherein the device has a second home network having the defined configuration, and wherein the defined configuration was previously established on the second home network.

\* \* \* \* \*